United States Patent
Shi et al.

(10) Patent No.: US 12,100,548 B2
(45) Date of Patent: *Sep. 24, 2024

(54) ULTRA HIGH MELT TEMPERATURE MICROPOROUS HIGH TEMPERATURE BATTERY SEPARATORS AND RELATED METHODS

(71) Applicant: Celgard, LLC, Charlotte, NC (US)

(72) Inventors: Lie Shi, Matthews, NC (US); C. Glen Wensley, Rock Hill, SC (US); Jill W. Watson, Lake Wylie, SC (US)

(73) Assignee: Celgard, LLC, Charlotte, NC (US)

( * ) Notice: Subject to any disclaimer, the term of this patent is extended or adjusted under 35 U.S.C. 154(b) by 129 days.

This patent is subject to a terminal disclaimer.

(21) Appl. No.: 16/934,828

(22) Filed: Jul. 21, 2020

(65) Prior Publication Data

US 2020/0350544 A1 Nov. 5, 2020

Related U.S. Application Data

(62) Division of application No. 13/193,691, filed on Jul. 29, 2011, now Pat. No. 10,720,624.

(60) Provisional application No. 61/369,939, filed on Aug. 2, 2010.

(51) Int. Cl.
| | |
|---|---|
| *H01M 10/00* | (2006.01) |
| *H01G 11/52* | (2013.01) |
| *H01M 10/0525* | (2010.01) |
| *H01M 50/417* | (2021.01) |
| *H01M 50/449* | (2021.01) |
| *H01M 50/489* | (2021.01) |
| *H01M 50/491* | (2021.01) |

(52) U.S. Cl.
CPC ........ *H01G 11/52* (2013.01); *H01M 10/0525* (2013.01); *H01M 50/417* (2021.01); *H01M 50/449* (2021.01); *H01M 50/489* (2021.01); *H01M 50/491* (2021.01); *Y02E 60/13* (2013.01)

(58) Field of Classification Search
CPC ........... H01M 50/449; H01M 10/0525; H01M 50/411; H01M 50/417; H01M 50/489; H01M 50/491; H01M 10/39; H01M 50/403; H01M 50/414; H01M 50/431; H01M 50/44; H01M 50/457; H01M 50/586; H01M 50/59; H01G 11/52; Y02E 60/13; Y02E 60/10; Y02P 70/50

See application file for complete search history.

(56) References Cited

U.S. PATENT DOCUMENTS

| | | | | |
|---|---|---|---|---|
| 4,217,404 | A | * | 8/1980 | Verzwyvelt ............ C08J 7/0427 427/430.1 |
| 4,298,666 | A | * | 11/1981 | Taskier ................ H01M 50/429 429/251 |
| 6,335,114 | B1 | | 1/2002 | Ueshima et al. |
| 8,252,449 | B2 | | 8/2012 | Tsukuda et al. |
| 8,445,132 | B2 | | 6/2013 | Fujikawa et al. |
| 9,023,534 | B2 | | 5/2015 | Nakamori et al. |
| 10,720,624 | B2 | * | 7/2020 | Shi ..................... H01M 10/0525 |
| 10,826,108 | B2 | * | 11/2020 | Wensley ............. H01M 50/403 |
| 2002/0122840 | A1 | * | 9/2002 | Lee ....................... D01D 5/0061 425/174.6 |
| 2005/0277026 | A1 | | 12/2005 | Niskikawa et al. |
| 2007/0066741 | A1 | | 3/2007 | Donovan et al. |
| 2007/0099072 | A1 | | 5/2007 | Hennige et al. |
| 2007/0264577 | A1 | | 11/2007 | Katayama et al. |
| 2007/0287062 | A1 | | 12/2007 | Tsukuda et al. |
| 2009/0029262 | A1 | | 1/2009 | Naruse |
| 2010/0151333 | A1 | * | 6/2010 | Nakamori ............. H01M 50/44 428/401 |
| 2023/0411789 | A1 | * | 12/2023 | Lee ..................... H01M 10/052 |

FOREIGN PATENT DOCUMENTS

| | | |
|---|---|---|
| JP | 2006348280 | 12/2006 |
| JP | 2009205955 | 9/2009 |
| JP | 2009205956 | 9/2009 |

* cited by examiner

*Primary Examiner* — Nicholas P D'Aniello
(74) *Attorney, Agent, or Firm* — Hammer & Associates, P.C.

(57) ABSTRACT

Disclosed or provided are non-shutdown high melt temperature or ultra high melt temperature microporous battery separators, high melt temperature separators, battery separators, membranes, composites, and the like that preferably prevent contact between the anode and cathode when the battery is maintained at elevated temperatures for a period of time and preferably continue to provide a substantial level of battery function (ionic transfer, discharge) when the battery is maintained at elevated temperatures for a period of time, methods of making, testing and/or using such separators, membranes, composites, and the like, and/or batteries, high temperature batteries, and/or Lithium-ion rechargeable batteries including one or more such separators, membranes, composites, and the like.

16 Claims, No Drawings

ULTRA HIGH MELT TEMPERATURE MICROPOROUS HIGH TEMPERATURE BATTERY SEPARATORS AND RELATED METHODS

CROSS REFERENCE TO RELATED APPLICATIONS

This application is a Divisional application which claims priority to and the benefit of U.S. application Ser. No. 13/193,691, filed Jul. 29, 2011, which claims benefit to U.S. Provisional Patent Application Ser. No. 61/369,939 filed Aug. 2, 2010 hereby fully incorporated by reference herein.

FIELD OF THE INVENTION

The invention is directed to non-shutdown high melt temperature or ultra high melt temperature microporous high temperature battery separators, membranes, composites, and the like that preferably prevent contact between the anode and cathode when the battery is maintained at elevated temperatures for a period of time and that preferably continue to provide a substantial level of battery function (ionic transfer, discharge) when the battery is maintained at elevated temperatures for a period of time, to methods of making, testing and/or using such separators, membranes, composites, components, and the like, and/or to high temperature batteries, Lithium-ion batteries, batteries, and the like including one or more such separators, membranes, composites, and the like.

BACKGROUND OF THE INVENTION

Manufacturers of Lithium-ion batteries strive to produce Lithium-ion batteries that are capable of functioning at very high temperatures.

Although battery separators are well known, such as high quality, polyolefin, Lithium-ion rechargeable battery separators manufactured and sold by Celgard, LLC of Charlotte, North Carolina, there is a need for improved battery separators for at least certain extreme conditions, high temperature applications, non-shutdown high melt temperature microporous high temperature battery separators, high melt temperature microporous Lithium-ion rechargeable battery separators, membranes, composites, components, and the like that preferably prevent contact between the anode and cathode when the battery is maintained at elevated temperatures for a period of time and that preferably continue to provide a substantial level of battery function (ionic transfer, discharge) when the battery is maintained at elevated temperatures for a period of time, methods of making, testing and/or using such separators, membranes, composites, components, and the like, and/or Lithium-ion batteries, high temperature batteries, Lithium-ion rechargeable batteries, batteries, and the like including one or more such separators, membranes, composites, and the like.

SUMMARY OF THE INVENTION

At least certain embodiments of the present invention may address the need for improved or novel battery separators for at least certain extreme conditions, high temperature applications, non-shutdown high melt temperature microporous high temperature battery separators, high melt temperature microporous Lithium-ion (Li-ion) rechargeable battery separators, ultra high melt temperature microporous high temperature battery separators, ultra high melt temperature microporous high temperature Lithium-ion rechargeable battery separators, battery separators, membranes, composites, layers, coatings, and the like that preferably prevent contact between the anode and cathode when the battery is maintained at elevated temperatures for a period of time and that preferably continue to provide a substantial level of battery function (ionic transfer, charge, and/or discharge) when the battery is maintained at elevated temperatures for a period of time, methods of making, testing and/or using such separators, membranes, composites, components, layers, coatings, and the like, and/or Lithium-ion batteries, high temperature batteries, Lithium-ion rechargeable batteries, other batteries, and the like (including batteries, cells, packs, accumulators, capacitors, and/or the like) including one or more such separators, membranes, composites, layers, coatings, and/or the like. Such Lithium-ion batteries, high temperature batteries, or other batteries, cells, packs, or the like may be of any shape, size and/or configuration, such as cylindrical, flat, rectangular, large scale such as large scale Electric Vehicle (EV), prismatic, button, envelope, box, wound, folded, z-fold, and/or the like.

At least selected embodiments of the invention are directed to high or ultra high temperature microporous battery separators, membranes, composites, components, layers, coatings, and/or the like that preferably not only prevent contact between the anode and cathode when the battery is maintained at elevated temperatures for a period of time, but that also continue to provide a substantial level of battery function (ionic transfer, charge and/or discharge) when the battery is maintained at elevated temperatures for a period of time, to methods of making, testing and/or using such separators, membranes, composites, components, layers, coatings, and the like, and/or to high temperature batteries including one or more such separators, membranes, composites, layers, coatings, and/or the like.

Manufacturers of Lithium-ion batteries are striving to achieve a Lithium-ion rechargeable battery that is capable of at least partial functioning at high temperatures (for example, at about 160 degrees Centigrade (deg C.) or Celsius, preferably at about 180 deg C., more preferably at about 200 deg C., and most preferably at about 220 deg C. or higher) for at least a period of time (for example, for at least 5 minutes, preferably for at least 15 minutes, and more preferably for at least 60 minutes or more). Such partial functioning preferably includes keeping the electrodes (anode and cathode) physically separated at high temperatures for a period of time, and also preferably includes allowing or providing at least partial ionic flow between the electrodes, and more preferably substantial full ionic flow. For example, at least one layer, coating, or component of the preferred separator keeps the electrodes (anode and cathode) physically separated for at least 5 minutes, preferably 15 minutes, and more preferably for 60 minutes or more, at about 160 deg C., preferably at about 180 deg C., more preferably at about 200 deg C., and most preferably at about 220 deg C. or higher, and at least one layer, coating, or component allows at least partial ionic flow between the electrodes at about 160 deg C. (for example, does not shutdown at 130 deg C.).

In another embodiment, a possibly preferred separator, layer, coating, or component keeps the electrodes (anode and cathode) physically separated for at least 5 minutes, preferably for at least 15 minutes, and more preferably for at least 60 minutes or more, and allows at least partial ionic flow between the electrodes at about 180 deg C. (for example, does not shutdown at 130 deg C.).

In still another embodiment, a possibly preferred separator, layer, coating, or component keeps the electrodes (anode and cathode) physically separated for at least 5 minutes, preferably for at least 15 minutes, and more preferably for at least 60 minutes or more, and allows at least partial ionic flow between the electrodes at about 200 deg C. (for example, does not shutdown at 130 deg C.). In yet another embodiment, a possibly preferred separator, layer, coating, or component keeps the electrodes (anode and cathode) physically separated for at least 5 minutes, preferably for at least 15 minutes, and more preferably for at least 60 minutes or more, and allows at least partial ionic flow between the electrodes at about 220 deg C. (for example, does not shutdown at 130 deg C.).

In order for a Lithium-ion rechargeable battery to function at high temperatures, the battery components including the microporous battery separator (or at least one or more layers, coatings or components thereof) preferably function at high temperatures, do not melt at high temperatures, have a high melt temperature, include at least one layer, coating or component having a high melt temperature, provide at least partial functioning at high temperature by keeping the electrodes (anode and cathode) physically separated for at least a short period of time, and/or the like. A possibly preferred high temperature separator has at least one layer, coating or component that has a high melt temperature, preferably >160 deg C., more preferably >180 deg C., still more preferably >200 deg C., and most preferably >220 deg C., and has a high level of dimensional and/or structural integrity needed to prevent contact between the anode and cathode when the battery is maintained at elevated temperatures for a period of time, preferably for at least 5 minutes, more preferably for at least 15 minutes, and still more preferably for at least 60 minutes or more, and preferably allows at least partial ionic flow between the electrodes at high temperatures at least for a period of time, preferably for at least 5 minutes, more preferably for at least 15 minutes, and still more preferably for at least 60 minutes or more.

A possibly more preferred high temperature separator has a high melt temperature, preferably >180 deg C., and more preferably >250 deg C., and has a high level of dimensional and/or structural integrity needed to prevent contact between the anode and cathode when the battery is maintained at elevated temperatures for a period of time.

A possibly most preferred high temperature separator has at least one layer, coating, or component including a polymer with a glass transition temperature (Tg) of about 250 deg C. or more (a high Tg polymer) and with a Tg suppression in electrolyte of about 50 deg C. or less (an effective Tg of about 200 deg C. or more in electrolyte), and has at least one layer having a high level of dimensional and/or structural integrity sufficient to prevent contact between the anode and cathode when the battery is maintained at elevated temperatures for a period of time. Preferably, the high Tg polymer should also be dissolvable in at least one solvent or solvent mixture, and more preferably the high Tg polymer is soluble in at least one moderately volatile solvent, such as DMAc.

In accordance with at least certain embodiments, it is highly desirable to have a high melt temperature separator with at least one layer, coating or component having a high level of dimensional and/or structural integrity (preferably both) sufficient to prevent contact between the anode and cathode when the battery is maintained at elevated temperatures, preferably >160 deg C., more preferably >180 deg C., still more preferably >200 deg C., and most preferably >220 deg C., for a period of time, preferably for at least 5 minutes, more preferably for at least 15 minutes, and still more preferably for at least 60 minutes, and that also provides or allows continued at least partial ionic flow between the electrodes, preferably at about 160 deg C., more preferably at 180 deg C., most preferably at 220 deg C. or more. Such a separator may be referred to as a non-shutdown high temperature melt integrity (HTMI) separator (NSHTMIS).

In accordance with at least selected embodiments, the possibly preferred inventive separator is either a high melt temperature battery separator including a porous membrane coated with a high glass transition temperature (Tg) polymer or blend (also referred to as a binder when used with filler or particles) on at least one side thereof or a stand alone (single or multi-ply) porous membrane having at least one layer made using a high Tg polymer or blend (with or without filler or particles). Possibly preferred is a non-heat set, high Tg polymer or blend. Preferably, the high Tg polymer should also be dissolvable in at least one solvent or solvent mixture, and more preferably the high Tg polymer is soluble in at least one moderately volatile solvent, such as DMAc.

A possibly most preferred high temperature separator has at least one layer including a high Tg polymer with a glass transition temperature (Tg) of about 250 deg C. or more and with a Tg suppression in electrolyte of about 50 deg C. or less (an effective Tg of about 200 deg C. or more in electrolyte), has a high level of dimensional and/or structural integrity needed to prevent contact between the anode and cathode when the battery is maintained at elevated temperatures for a period of time, and preferably provides or allows at least partial ionic flow between the electrodes. The preferred high Tg polymer should also be dissolvable in at least one solvent or solvent mixture, and more preferably the high Tg polymer is soluble in at least one moderately volatile solvent.

In accordance with selected embodiments, at least one object of the present invention is to provide a high melt temperature microporous Lithium-ion rechargeable battery separator, membrane or composite that has at least one layer, component or coating that is capable of retaining its physical structure up to 250 deg C. in a Lithium-ion rechargeable battery (or battery, cell, pack, accumulator, capacitor, and/or the like) for at least a short period of time. This particular possibly preferred separator, membrane or composite preferably includes at least one layer, coating or component preferably composed of or including one or more polymers which have an effective glass transition temperature ($T_g$) in electrolyte greater than 160 deg C., more preferably greater than 180 deg C., and most preferably at least 200 deg C. Preferably, the separator, membrane or composite includes a polymer, blend or combination of polymers having a glass transition temperature ($T_g$) of at least 250 deg C., such as but not limited to, polyimidazoles, polybenzimidazole (PBI), polyimides, polyamideimides, polyaramids, polysulfones, aromatic polyesters, polyketones, and/or blends, mixtures, and combinations thereof. The possibly preferred separator, membrane or composite may include or be composed of a single or double sided high Tg polymer microporous coating (with or without high temperature fillers or particles) applied to a microporous base membrane or film. Alternatively, the possibly preferred separator or membrane may be a free standing high Tg polymer microporous separator or membrane (single or multiple ply, single or multiple layer, with or without high temperature fillers and/or particles). Yet another possibly preferred separator, membrane or composite may include at least one high Tg polymer microporous layer, coating or component (with or without high temperature fillers and/or particles). Still yet another possibly preferred separator, membrane or composite may include or be composed of a single or double sided high Tg polymer microporous coating (with or without high temperature fillers or particles) applied to a high Tg polymer microporous base membrane or film (with or without high temperature fillers or particles).

Yet another possibly preferred separator may consist of an electrospun high Tg polymer microporous membrane. In accordance with at least selected embodiments, a possibly preferred inventive separator is a high melt temperature battery separator consisting of an electrospun microporous membrane of a high glass transition temperature (Tg) polymer preferably Polybenzimidazole (PBI) or a blend of PBI with another polymer or polymers. Although PBI may be preferred, a blend of PBI with another polymer or polymers such as polyaramids, polyimides, polyamideimide, polyvinylidene fluoride, co-polymers of polyvinylidene fluoride, and blends, mixtures and/or combinations thereof may also be used.

Yet another possibly preferred separator may include one or more layers or coatings of an electrospun high Tg polymer, a blend of high Tg polymers, or a high Tg polymer with another polymer or polymers. Although PBI may be preferred, a blend of PBI with another polymer or polymers such as polyaramids, polyimides, polyamideimide, polyvinylidene fluoride, co-polymers of polyvinylidene fluoride, and blends, mixtures and/or combinations thereof may also be used.

Yet another possibly preferred separator may include two or more layers or coatings of an electrospun high Tg polymer, a blend of high Tg polymers, or a high Tg polymer with another polymer or polymers. Although PBI may be preferred, a blend of PBI with another polymer or polymers such as polyaramids, polyimides, polyamideimide, polyvinylidene fluoride, co-polymers of polyvinylidene fluoride, and blends, mixtures and/or combinations thereof may also be used.

Yet another possibly preferred separator may include at least one porous membrane or film of a high Tg polymer, a blend of high Tg polymers, or a high Tg polymer with another polymer or polymers, and at least one layer or coating of an electrospun high Tg polymer, a blend of high Tg polymers, or a high Tg polymer with another polymer or polymers.

In accordance with at least selected embodiments, a possibly preferred inventive separator is a non-shutdown ultra high melt temperature microporous battery separator including at least one porous membrane or film a high glass transition temperature (Tg) polymer or a blend of a high Tg polymer with another polymer or polymers. Although PBI may be preferred, a blend of PBI with another polymer or polymers such as polyaramids, polyimides, polyamideimide, polyvinylidene fluoride, co-polymers of polyvinylidene fluoride, and blends, mixtures and/or combinations thereof may also be used.

In at least selected separator or membrane embodiments, the high Tg polymer can be coated onto a microporous base membrane made of a thermoplastic polymer. Preferably, the high Tg polymer is soluble in at least one moderately volatile solvent. Thermoplastic polymers include, but are not limited to, polyolefins such as polyethylene, polypropylene, polymethylpentene, and/or blends, mixtures, or combinations thereof. Such polyolefin microporous base membranes are available from Celgard, LLC of Charlotte, North Carolina. The microporous base membranes can be manufactured by, for example, a dry stretch process (known as the Celgard® dry stretch process) of Celgard, LLC of Charlotte, North Carolina, or by a wet process also known as a phase separation or extraction process of Celgard Korea Inc. of South Korea, Asahi of Japan and Tonen of Japan. The base membrane may be a single layer (one or more plies) of Polypropylene or Polyethylene, or a multi-layer membrane, such as a tri-layer membrane e.g., Polypropylene/Polyethylene/Polypropylene (PP/PE/PP) or Polyethylene/Polypropylene/Polyethylene (PE/PP/PE), bi-layer membrane (PP/PE or PE/PP), or the like.

Some base membranes or films, such as Polypropylene, may require pre-treatment in order to alter the surface characteristics of the membrane and improve the adhesion of the high Tg polymer coating to one or both sides of the base membrane. Pre-treatments may include, but are not limited to, priming, stretching, corona treatment, plasma treatment, and/or coating, such as surfactant coatings on one or both sides thereof.

In accordance with selected embodiments, at least one object of the present invention is to provide a high melt temperature microporous Lithium-ion rechargeable battery separator, membrane or composite that has at least one layer or coating that is capable of retaining its physical structure up to 200 deg C., preferably up to 250 deg C., in a Lithium-ion rechargeable battery (or cell, pack, accumulator, capacitor, and/or the like) for at least a short period of time. This particular possibly preferred separator, membrane or composite includes at least one layer preferably composed of or including one or more polymers which have an effective glass transition temperature ($T_g$) in electrolyte greater than 160 deg C., more preferably greater than 180 deg C., and most preferably at least 200 deg C. Preferably, the separator, membrane or composite includes a polymer, blend or combination of polymers having a glass transition temperature ($T_g$) of at least 250 deg C., such as but not limited to, polyimidazoles, polybenzimidazole (PBI), polyimides, polyamideimides, polyaramids, polysulfones, aromatic polyesters, polyketones, and/or blends, mixtures, and combinations thereof. The possibly preferred separator, membrane or composite may include or be composed of a single or double sided high Tg polymer microporous coating (with or without high temperature fillers and/or particles) applied to a microporous base membrane or film. Alternatively, the possibly preferred separator or membrane may be a free standing high Tg polymer microporous separator or membrane (with or without high temperature fillers or particles). Yet another possibly preferred separator, membrane or composite may include at least one high Tg polymer microporous layer (with or without high temperature fillers or particles).

Still yet another preferred separator may include or be composed of an electrospun coated, single or double sided, high Tg polymer microporous coating applied to a microporous base membrane or film. In accordance with at least selected embodiments, a possibly preferred inventive separator is a high melt temperature battery separator consisting of a porous membrane with an electrospun nanofiber coating of a high glass transition temperature (Tg) polymer, preferably Polybenzimidazole (PBI) or a blend of PBI with other polymer or polymers, on at least one side thereof and preferably coated on both sides. Although PBI may be preferred, a blend of PBI with another polymer or other polymers such as polyaramids, polyimides, polyamideimide, polyvinylidene fluoride, co-polymers of polyvinylidene fluoride and blends, mixtures and/or combinations thereof may also be used.

In accordance with selected embodiments, at least one object of the present invention is to provide a high melt temperature coated or electrospun coated microporous Lithium-ion rechargeable battery separator or membrane that is capable of retaining its physical structure up to 250 deg C. in a Lithium-ion rechargeable battery (cell, pack, battery, accumulator, capacitor, or the like) for at least a short period of time. This particular possibly preferred separator or membrane preferably has an electrospun nanofiber coating of polybenzimidazole (PBI) or a blend of PBI with another polymer or other polymers applied to at least one side thereof and preferably coated on two sides of a microporous base membrane. The preferred electrospun nanofiber coating consists of nanoscale PBI fibers which are in the range of 10 to 2,000 nanometers in diameter, preferably 20 to 1,000 nanometers in diameter, more preferably 25 to 800 nanometers in diameter and most preferably 30 to 600 nanometers in diameter. The preferred targeted basis weight of the nanoscale PBI electrospun coating of the high melt temperature microporous Lithium-ion rechargeable battery separator membrane is 1.0 to 8.0 $g/m^2$ or more, preferably 2.0 to 6.0 $g/m^2$, more preferably 2.2 to 5.0 $g/m^2$ and most preferably 2.5 to 5.0 $g/m^2$. The preferred fibers are smooth when viewed by SEM at 5,000× magnification and are non-porous. The electrospinning process can deposit nanoscale PBI fibers on the surface of a base microporous membrane in a random fashion resembling spaghetti noodles scattered on a surface.

The electrospinning coating approach can coat a high Tg polymer such as PBI or a blend of PBI with another polymer or polymers such as polyaramids, polyimides and polyamideimide and blends, mixtures and/or combinations thereof onto a microporous porous membrane, film, carrier, support, or belt without a detrimental effect to the pore structure or the porosity of the porous base membrane, that is, the nanoscale electrospun fibers do not block a major portion of the pores of the base membrane. The electrospinning process provides a method of applying a high Tg polymer in the form of nanoscale fibers onto a microporous base membrane without the nanoscale fibers themselves required to be porous. The spaces between the fibers provide the necessary openings or porosity in the electrospun coating or layer. A process step to form pores in the electrospun nanoscale high Tg polymer fibers is not required. In the electrospinning process, the high Tg polymers or polymers are usually dissolved in a solvent or solvents. The solvent is evaporated during the formation of the electrospun fibers. Typically, dip coated or gravure coated methods of applying polymers onto a microporous base membrane may require the coated film to be immersed in a bath designed for removing the polymer solvent (or other process to create pores). The preferred electrospinning method of applying high Tg polymers onto microporous membranes or for forming stand alone membranes may be simpler than other processes from a manufacturing point of view because an immersion step or extraction step to remove the solvent in order to form a porous structure in the coating is not required. Electrospinning can be a less costly manufacturing process for the application of nanoscale high Tg polymer fibers onto a microporous membrane to produce a high melt temperature microporous Lithium-ion rechargeable battery separator or membrane.

In at least selected separator or membrane embodiments, the high Tg polymer can be coated onto a microporous base membrane made of a thermoplastic polymer provided the high Tg polymer is soluble in at least one moderately volatile solvent. Thermoplastic polymers include, but are not limited to, polyolefins such as polyethylene, polypropylene, polymethylpentene, and/or blends, mixtures, or combinations thereof. Such polyolefin microporous base membranes are available from Celgard, LLC of Charlotte, North Carolina. The microporous base membranes can be manufactured by, for example, a dry stretch process (known as the Celgard® dry stretch process) of Celgard, LLC of Charlotte, North Carolina, or by a wet process also known as a phase separation or extraction process of Celgard Korea Inc. of South Korea, Asahi of Japan and Tonen of Japan. The base membrane may be a single layer (one or more plies) of Polypropylene or Polyethylene, or a multi-layer membrane, such as a tri-layer membrane e.g., Polypropylene/Polyethylene/Polypropylene (PP/PE/PP) or Polyethylene/Polypropylene/Polyethylene (PE/PP/PE), bi-layer membrane (PP/PE or PE/PP), or the like.

Some base membranes or films, such as Polypropylene, may require pre-treatment in order to alter the surface characteristics of the membrane and improve the adhesion of the high Tg polymer coating or nanoscale electrospun fibers to one or both sides of the base membrane. Pre-treatments may include, but are not limited to, priming, stretching, corona treatment, plasma treatment, and/or coating, such as surfactant coatings on one or both sides thereof.

DETAILED DESCRIPTION OF THE INVENTION

At least certain embodiments of the present invention may address the need for improved or novel battery separators for at least certain extreme conditions, high temperature applications, non-shutdown high melt temperature microporous high temperature battery separators, high melt temperature microporous Lithium-ion rechargeable battery separators, ultra high melt temperature microporous high temperature battery separators, ultra high melt temperature microporous high temperature Lithium-ion rechargeable battery separators, battery separators, membranes, composites, layers, coatings, and the like that preferably prevent contact between the anode and cathode when the battery is maintained at elevated temperatures for a period of time and preferably continue to provide a substantial level of battery function (ionic transfer, charge and/or discharge) when the battery is maintained at elevated temperatures for a period of time, methods of making, testing and/or using such separators, membranes, composites, components, layers, coatings, and the like, and/or Lithium-ion batteries, high temperature batteries, Lithium-ion rechargeable batteries, other batteries, and the like (including batteries, cells, packs, accumulators, capacitors, or the like) including one or more such separators, membranes, composites, and/or the like. Such Lithium-ion batteries, high temperature batteries, or other batteries, cells, packs, or the like may be of any shape, size and/or configuration, such as cylindrical, flat, rectangular, large scale such as large scale Electric Vehicle (EV), prismatic, button, envelope, box, folded, wound, and/or the like.

At least other selected embodiments of the invention are directed to high or ultra high temperature microporous battery separators, membranes, composites, components, layers, coatings, and the like that preferably not only prevent contact between the anode and cathode when the battery is maintained at elevated temperatures for a period of time, but also that continue to provide a substantial level of battery function (ionic transfer, discharge) when the battery is maintained at elevated temperatures for a period of time, to methods of making, testing and/or using such separators, membranes, composites, components, and the like, and/or to high temperature batteries including one or more such separators, membranes, composites, coatings, layers, and the like.

Manufacturers of Lithium-ion batteries are striving to achieve a Lithium-ion rechargeable battery that is capable of at least partial functioning at high temperatures (for example, at about 160 degrees Centigrade (deg C.) or Celsius, preferably at about 180 deg C., more preferably at about 200 deg C., most preferably at about 220 deg C. or higher) for at least a period of time. Such partial functioning preferably includes keeping the electrodes (anode and cathode) physically separated at high temperatures for a period of time, and also preferably includes allowing or providing at least partial ionic flow between the electrodes, more preferably substantial full ionic flow. For example, at least one layer of the preferred separator keeps the electrodes (anode and cathode) physically separated for at least 5 minutes, preferably 15 minutes, and more preferably for 60 minutes or more, at about 160 deg C., preferably at about 180 deg C., more preferably at about 200 deg C., most preferably at about 220 deg C. or higher, and at least one layer allows at least partial ionic flow between the electrodes at about 160 deg C. (it does not shutdown at 130 deg C.). In another embodiment, a possibly preferred separator keeps the electrodes (anode and cathode) physically separated for at least 5 minutes, preferably for at least 15 minutes, and more preferably for at least 60 minutes, and allows at least partial ionic flow between the electrodes at about 180 deg C. (it does not shutdown at 130 deg C.). In another embodiment, a possibly preferred separator keeps the electrodes (anode and cathode) physically separated for at least 5 minutes, preferably for at least 15 minutes, and more preferably for at least 60 minutes, and allows at least partial ionic flow between the electrodes at about 200 deg C. (it does not shutdown at 130 deg C.). In another embodiment, a possibly preferred separator keeps the electrodes (anode and cathode) physically separated for at least 5 minutes, preferably for at least 15 minutes, and more preferably for at least 60 minutes or more, and allows at least partial ionic flow between the electrodes at about 220 deg C. or higher (it does not shutdown at 130 deg C.).

In order for a Lithium-ion rechargeable battery to function at high temperatures, the battery components including the microporous battery separator (or at least one layer or coating thereof) preferably function at high temperatures, do not melt at high temperatures, have a high melt temperature, include at least one layer or component having a high melt temperature, provide at least partial functioning at high temperature by keeping the electrodes (anode and cathode) physically separated for at least a short period of time, and/or the like. A possibly preferred high temperature separator has at least one layer or component that has a high melt temperature, preferably >160 deg C., more preferably >180 deg C., still more preferably >200 deg C., and most preferably >220 deg C., and has a high level of dimensional and/or structural integrity needed to prevent contact between the anode and cathode when the battery is maintained at elevated temperatures for a period of time, preferably for at least 5 minutes, preferably for at least 15 minutes, and more preferably for at least 60 minutes, and preferably allows at least partial ionic flow between the electrodes at high temperatures at least for a period of time.

A possibly more preferred high temperature separator has a high melt temperature, preferably >180 deg C. and more preferably >250 deg C., and has a high level of dimensional and/or structural integrity needed to prevent contact between the anode and cathode when the battery is maintained at elevated temperatures for a period of time.

A possibly most preferred high temperature separator has at least one layer including a polymer with a glass transition temperature (Tg) of about 250 deg C. or more (a high Tg polymer) and with a Tg suppression in electrolyte of about 50 deg C. or less (an effective Tg of about 200 deg C. or more in electrolyte), and has at least one layer having a high level of dimensional or structural integrity sufficient to prevent contact between the anode and cathode when the battery is maintained at elevated temperatures for a period of time. Preferably, the high Tg polymer should also be dissolvable in at least one solvent or solvent mixture, and more preferably the high Tg polymer is soluble in at least one moderately volatile solvent, such as DMAc.

In accordance with at least certain embodiments, it is highly desirable to have a high melt temperature separator with at least one layer having a high level of dimensional or structural integrity (preferably both) sufficient to prevent contact between the anode and cathode when the battery is maintained at elevated temperatures, preferably >160 deg C., more preferably >180 deg C., still more preferably >200 deg C., and most preferably >220 deg C., for a period of time, preferably for at least 5 minutes, preferably for at least 15 minutes, and more preferably for at least 60 minutes, and also provides or allows continued at least partial ionic flow between the electrodes, preferably at about 160 deg C., more preferably at 180 deg C., most preferably at 220 deg C. Such a separator may be referred to as a non-shutdown high temperature melt integrity (HTMI) separator (NSHTMIS).

In accordance with at least selected embodiments, the possibly preferred inventive separator is either a high melt temperature battery separator including a porous membrane coated with a high glass transition temperature (Tg) polymer or blend (also referred to as a binder when used with filler or particles) on at least one side thereof or a stand alone (single or multi-ply) porous membrane having at least one layer made using a high Tg polymer or blend. Possibly preferred is a non-heat set, high Tg polymer or blend. Preferably, the high Tg polymer should also be dissolvable in at least one solvent or solvent mixture, and more preferably the high Tg polymer is soluble in at least one moderately volatile solvent, such as DMAc.

A possibly most preferred high temperature separator has at least one layer including a high Tg polymer with a glass transition temperature (Tg) of about 250 deg C. or more and with a Tg suppression in electrolyte of about 50 deg C. or less (an effective Tg of about 200 deg C. or more in electrolyte), and has a high level of dimensional or structural integrity needed to prevent contact between the anode and cathode when the battery is maintained at elevated temperatures for a period of time. The preferred high Tg polymer should also be dissolvable in at least one solvent or solvent mixture, and preferably the high Tg polymer is soluble in at least one moderately volatile solvent.

In accordance with selected embodiments, at least one object of the present invention is to provide a high melt temperature microporous Lithium-ion rechargeable battery separator, membrane or composite that has at least one layer or coating that is capable of retaining its physical structure up to 250 deg C. in a Lithium-ion rechargeable battery (battery, cell, pack, accumulator, capacitor, or the like) for at least a short period of time. This particular possibly preferred separator, membrane or composite includes at least one layer, coating or component preferably composed of or including one or more polymers which have an effective glass transition temperature ($T_g$) in electrolyte greater than 160 deg C., more preferably greater than 180 deg C., and most preferably at least 200 deg C. Preferably, the separator, membrane or composite includes a polymer, blend or combination of polymers having a glass transition temperature ($T_g$) of at least 250 deg C., such as but not limited to, polyimidazoles, polybenzimidazole (PBI), polyimides, polyamideimides, polyaramids, polysulfones, aromatic polyesters, polyketones, and/or blends, mixtures, and combinations thereof. The possibly preferred separator, membrane or composite may include or be composed of a single or double sided high Tg polymer microporous coating (with or without high temperature fillers or particles) applied to a microporous base membrane or film. Alternatively, the possibly preferred separator or membrane may be a free standing high Tg polymer microporous separator or membrane (with or without high temperature fillers or particles). Yet another possibly preferred separator, membrane or composite may include at least one high Tg polymer microporous layer or coating (with or without high temperature fillers or particles). Still yet another possibly preferred separator, membrane or composite may include or be composed of a single or double sided high Tg polymer microporous coating (with or without high temperature fillers or particles) applied to a high Tg polymer microporous base membrane or film (with or without high temperature fillers or particles).

Still yet another possibly preferred separator may be composed of a high Tg polymer electrospun microporous membrane. In accordance with at least selected embodiments, a possibly preferred inventive separator is a high melt temperature battery separator consisting of an electrospun polymer microporous membrane of a high glass transition temperature (Tg) polymer preferably Polybenzimidazole (PBI) or a blend of PBI with other polymer or polymers. Although PBI may be preferred, a blend of PBI with other polymer or polymers such as polyaramids, polyimides, polyamideimide, polyvinylidene fluoride, co-polymers of polyvinylidene fluoride and blends, mixtures and/or combinations thereof may also be used.

In at least selected separator or membrane embodiments, the high Tg polymer can be coated onto a microporous base membrane made of a thermoplastic polymer provided the high Tg polymer is soluble in at least one moderately volatile solvent. Thermoplastic polymers include, but are not limited to, polyolefins such as polyethylene, polypropylene, polymethylpentene, and/or blends, mixtures, or combinations thereof. Such polyolefin microporous base membranes are available from Celgard, LLC of Charlotte, North Carolina. The microporous base membranes can be manufactured by, for example, a dry stretch process (known as the Celgard® dry stretch process) of Celgard, LLC of Charlotte, North Carolina, or by a wet process also known as a phase separation or extraction process of Celgard Korea Inc. of South Korea, Asahi of Japan and Tonen of Japan. The base membrane may be a single layer (one or more plies) of Polypropylene or Polyethylene, or a multi-layer membrane, such as a tri-layer membrane e.g., Polypropylene/Polyethylene/Polypropylene (PP/PE/PP) or Polyethylene/Polypropylene/Polyethylene (PE/PP/PE), bi-layer membrane (PP/PE or PE/PP), or the like.

Some base membranes or films, such as Polypropylene, may require pre-treatment in order to alter the surface characteristics of the membrane and improve the adhesion of the high Tg polymer coating to one or both sides of the base membrane. Pre-treatments may include, but are not limited to, priming, stretching, corona treatment, plasma treatment, and/or coating, such as surfactant coatings on one or both sides thereof.

At least certain embodiments of the present invention may address the need for improved or novel battery separators for at least certain extreme conditions, high temperature applications, non-shutdown high melt temperature microporous battery separators, non-shutdown high melt temperature microporous high temperature battery separators, non-shutdown high melt temperature microporous Lithium-ion rechargeable battery separators, battery separators, membranes, composites, and the like.

At least selected embodiments of the invention are directed to non-shutdown high melt temperature microporous battery separators, membranes, composites, components, and the like, to methods of making, testing and/or using such separators, membranes, composites, components, and the like, and/or to batteries including one or more such separators, membranes, composites, and the like.

At least other selected embodiments of the invention are directed to non-shutdown ultra high temperature microporous battery separators, membranes, composites, components, and the like, that preferably continue to provide a substantial level of battery function (ionic transfer, discharge) when the battery is maintained at elevated temperatures for an extended period of time, such as 2 or more hours, to methods of making, testing and/or using such separators, membranes, composites, components, and the like, and/or to high temperature batteries including one or more such separators, membranes, composites, and the like.

At least certain objects of the present invention are directed to battery separators for at least certain extreme conditions, high temperature applications, non-shutdown high melt temperature microporous battery separators, non-shutdown high melt temperature microporous high temperature battery separators, high melt temperature microporous Lithium-ion rechargeable battery separators, battery separators, separator membranes, and the like, methods of making, testing and/or using such separators, membranes, and the like, and/or batteries, high temperature batteries, Lithium-ion rechargeable batteries, other batteries, cells, packs, accumulators, capacitors, and the like including one or more such separators, membranes, and the like. Such batteries, cells, packs, or the like may be of any shape, size and/or configuration, such as cylindrical, flat, rectangular, large scale, large scale Electric Vehicle (EV), prismatic, button, envelope, box, and/or the like.

At least certain objects of the invention are directed to non-shutdown high melt temperature microporous Lithium-ion rechargeable battery separators, membranes, and the like that preferably not only prevent contact between the anode and cathode when the battery is maintained at elevated temperatures for a period of time, but also that provide for ionic transfer between the anode and cathode when the battery is maintained at elevated temperatures for a period of time, to methods of making, testing and/or using such separators, membranes, and the like, and/or to Lithium-ion rechargeable batteries including one or more such separators, membranes, and the like.

At least other selected objects of the invention are directed to high, very high or ultra high temperature microporous battery separators, membranes, and the like that preferably not only prevent contact between the anode and cathode when the battery is maintained at elevated temperatures for a period of time, but also that continue to provide ionic transfer and battery function when the battery is maintained at elevated temperatures for a period of time, to methods of making, testing and/or using such separators, membranes, and the like, and/or to high temperature batteries including one or more such separators, membranes, and the like.

In accordance with selected embodiments, at least one object of the present invention is to provide a high melt temperature microporous battery separator or membrane that is capable of retaining its physical structure up to 250 deg C. in a battery, cell, pack, accumulator, capacitor, or the like. This particular possibly preferred separator or membrane is preferably composed of one or more polymers which have a glass transition temperature ($T_g$) greater than 165 deg C. including, more preferably a polymer, blend or combination which has a glass transition temperature ($T_g$) greater than 180 deg C., most preferably which has a glass transition temperature ($T_g$) greater than 250 deg C., such as but not limited to, polyimidazoles, polybenzimidazole (PBI), polyimides, polyamideimides, polyaramids, polysulfones, aromatic polyesters, polyketones, and/or blends, mixtures, and combinations thereof. The possibly preferred separator or membrane can be composed of a single or double sided high Tg polymer coating applied to a microporous base membrane or more preferably can be a free standing high Tg polymer microporous separator, film, or membrane. The high Tg polymer can be coated onto a microporous base membrane or film made of a thermoplastic polymer and preferably the high Tg polymer is soluble in at least one moderately volatile solvent.

Thermoplastic polymers include, but are not limited to, polyolefins such as polyethylene, polypropylene, polymethylpentene, and blends, mixtures, or combinations thereof. The base membrane may be a single layer (one or more plies) or multi-layer membrane, such as a tri-layer membrane e.g., Polypropylene/Polyethylene/Polypropylene (PP/PE/PP) or Polyethylene/Polypropylene/Polyethylene (PE/PP/PE), bi-layer membrane (PP/PE or PE/PP), or the like.

Some base membranes or films, such as Polypropylene, may require pre-treatment in order to alter the surface characteristics of the membrane and improve the adhesion of the high Tg polymer coating to the base membrane. Pre-treatments may include, but are not limited to, priming, stretching, corona treatment, plasma treatment, and/or coating, such as surfactant coatings on one or both sides thereof.

Yet another possibly preferred separator may be composed of a porous membrane comprised of electrospun nanofibers. In accordance with at least selected embodiments, a possibly preferred inventive separator is a high melt temperature battery separator consisting of a porous membrane comprised of electrospun nanofibers of a high glass transition temperature (Tg) polymer preferably Polybenzimidazole (PBI) or a blend of PBI with other polymer or polymers. Although PBI may be preferred, a blend of PBI with other polymer or polymers such as polyaramids, polyimides, polyamideimide, polyvinylidene fluoride, co-polymers of polyvinylidene fluoride and blends, mixtures and/or combinations thereof may also be used.

In accordance with at least one embodiment, an object of the invention is to provide a ultra high melt temperature microporous separator that is capable of retaining its physical structure up to 250 deg C. or more in a high temperature battery.

In accordance with at least selected preferred embodiments, the high Tg polymer may be applied in a coating solution by a coating slot die, a doctor blade, a Meyer rod, or a direct or reverse gravure type roll. A coating solution may be prepared by dissolving the high $T_g$ polymer in a suitable solvent, for example, Dimethylacetamide (DMAc), N-methyl pyrrolidinone, 1,4 dioxane, acetone, etc. The coating solution may further contain one or more of: 1) a non-solvent for the high Tg polymer, 2) a cross linking agent such as a dihalide, dialdehyde or acid dichloride, 3) a surfactant to improve coating uniformity, 4) inorganic particles such as $Al_2O_3$, $TiO_2$, $CaCO_3$, $BaSO_4$, silica carbide, boron nitride, or 5) organic polymers such as powdered PTFE, or other chemically inert, small (preferably less than 2 microns, more preferably less than 1 micron), dry, and high melt temperature.

Following application of the high Tg polymer, the membrane may be immersed in a gelation bath. The gelation bath may consist of a single bath comprised of a non-solvent or a mixture of non-solvents or the gelation bath may consist of a series of baths which include mixtures of a solvent and one or more non-solvents. In the case where the coating operation consists of a series of baths, the final bath should preferably consist of a non-solvent or mixtures of non-solvents. It should be noted that the distance between the coating die and the gelation bath should be minimized in order to prevent contact of the coating mixture with the air. The bath may be at room temperature, below room temperature or at an elevated temperature.

The gelation bath step serves to precipitate the high Tg polymer onto the base membrane, remove the polymer solvent (or solvents) and create the porous structure in the high Tg polymer coating or layer. The choice of bath composition and the temperature of the bath controls the rate of precipitation of the polymer and the porosity and pore structure of the porous coating or layer formed on the base membrane, film or carrier.

The coated membrane, film or carrier may then be dried in an oven and can be dried on a tenter frame to prevent shrinkage or curling of the film. The final high Tg polymer coating or layer thickness may preferably be 1-20 μm with the coated microporous membrane or separator having a total thickness of preferably 5-40 μm. In at least certain possibly preferred embodiments, it may be preferred to have a coating of at least about 4 μm, preferably at least about 6 μm, more preferably at least about 8 μm on at least one side, preferably on both sides, of a polyolefin microporous membrane to form an HTMI separator.

In accordance with at least selected embodiments, a possibly preferred inventive separator is a high melt temperature battery separator including a porous membrane, coating or layer comprised of spun fibers, preferably electrospun nanofibers of a high glass transition temperature (Tg) polymer preferably Polybenzimidazole (PBI) or a blend of PBI with other polymer or polymers. Although PBI may be preferred, a blend of PBI with other polymer or polymers such as polyaramids, polyimides, polyamideimide, polyvinylidene fluoride, co-polymers of polyvinylidene fluoride and blends, mixtures and/or combinations thereof may also be used.

In accordance with selected embodiments, at least one object of the present invention is to provide a high melt temperature coated or electrospun coated microporous Lithium-ion rechargeable battery separator or membrane that is capable of retaining its physical structure up to 250 deg C. in a Lithium-ion rechargeable battery (cell, pack, battery, accumulator, capacitor, or the like). This particular possibly preferred separator or membrane preferably consists an electrospun nanofibers of polybenzimidazole (PBI) or a blend of PBI with other polymer or polymers. The electrospinning approach can combine a high Tg polymer such as PBI or a blend of PBI with another polymer or polymers such as polyaramids, polyimides and polyamideimide and blends, mixtures and/or combinations thereof.

Another possibly preferred inventive separator is an electrospun coated microporous battery separator, having an electrospun nanofiber coating of a high glass transition temperature (Tg) polymer preferably Polybenzimidazole (PBI) on at least one side thereof and preferably coated on two sides (on both sides of the porous base film). Although PBI may be preferred, a blend of PBI with other polymer or polymers such as polyaramids, polyimides, polyamideimide, polyvinyldiene fluoride and co-polymers of polyvinylidene fluoride and blends, mixtures and/or combinations thereof may also be used.

Electrospinning is a process that can be used to create polymeric nanofibers in the range of 40-2,000 nm. The electrospinning process uses an electric field to draw a polymer solution from the tip of a capillary to a collector. A voltage is applied to the polymer solution which causes a fine stream of the polymer solution to be drawn towards a grounded collector. The fine stream dries to form polymeric fibers which build up a three dimensional fibrous web structure on the collector. Electrospinning can be used to apply a nanofiber polymer coating onto a substrate such as a microporous membrane, film, carrier, or the like.

In accordance with selected embodiments, at least one object of the present invention is to provide a high melt temperature electrospun coated microporous Lithium-ion rechargeable battery separator or membrane that is capable of retaining its physical structure up to 250 deg C. in a Lithium-ion rechargeable battery (cell, pack, battery, accumulator, capacitor, or the like) for at least a short period of time. This particular possibly preferred separator or membrane preferably has an electrospun nanofiber coating of polybenzimidazole (PBI) or a blend of PBI with another polymer or polymers applied to at least one side thereof and preferably coated on two sides of a microporous base membrane or film. The electrospun nanofiber coating preferably consists of nanoscale PBI fibers which are in the range of 10 to 2,000 nanometers in diameter, preferably 20 to 1,000 nanometers in diameter, more preferably 25 to 800 nanometers in diameter and most preferably 30 to 600 nanometers in diameter. The preferred targeted basis weight of the nanoscale PBI electrospun coating of the high melt temperature microporous Lithium-ion rechargeable battery separator membrane is 1.0 to 8.0 $g/m^2$ or more, preferably 2.0 to 6.0 $g/m^2$, more preferably 2.2 to 5.0 $g/m^2$, and most preferably 2.5 to 5.0 $g/m^2$.

The electrospinning process can deposit nanoscale PBI fibers on the surface of a base microporous membrane, film, or composite in a random fashion building a three dimensional nanoscale fibrous web structure on the base microporous membrane. The fibers preferably have a smooth surface appearance when viewed by SEM at 5,000× magnification and are preferably non-porous, that is, the fibers do not have any pores or holes.

The electrospinning coating approach can coat a high Tg polymer such as PBI or a blend of PBI and another polymer or polymers such as polyaramids, polyimides and polyamideimide and blends, mixtures and/or combinations thereof onto a microporous porous membrane without an detrimental effect to the pore structure or the porosity of the porous base membrane, that is, the nanoscale electrospun fibers do not block the pores of the base membrane. The electrospinning process provides a method of applying a high Tg polymer in the form of nanoscale fibers onto a microporous base membrane without the nanoscale fibers themselves being porous. The spaces between the fibers may provide the desired porosity. Therefore an additional process step to form pores in the electrospun nanoscale high Tg polymer fibers is not required. In the preferred electrospinning process, the high Tg polymers or polymers are dissolved in a solvent or solvents. The solvent is evaporated during the formation of the electrospun fibers. Typically, dip coated or gravure coated methods of applying polymers onto a microporous base membrane may require the coated film to be immersed in a bath designed for removing or extracting the polymer solvent. This immersion step forms a porous structure in the coating. The preferred electrospinning method of applying high Tg polymers onto microporous membranes can be simpler from a manufacturing point of view due to the fact that an extraction or immersion step to remove the solvent and form pores in the coating is not required.

Example 1

A 13 um Celgard® EK1321 PE microporous membrane was coated with a 4 µm coating layer consisting of Polybenzimidazole (available as a 26% dope in DMAc from PBI Performance Products in Rock Hill, SC) and Degussa fumed Alumina 20 nm diameter particles. The coating solution is prepared by first drying the Alumina particles in a 180 deg C. oven overnight to remove moisture. A 25% by weight slurry of the dried Alumina particles in DMAc is then prepared. The final coating composition is 7% polybenzimidazole (PBI), 28% Alumina and 65% DMAc. The coating is applied with a slot die as a single sided coating and the coated membrane dried in an oven at 80-100 deg C. for a time period of less than 15 minutes.

Example 2

A 13 um Celgard® EK1321 PE microporous membrane was coated with a 7 µm coating layer consisting of Polybenzimidazole (available through PBI Performance Products in Rock Hill, SC) and Degussa fumed Alumina 20 nm diameter particles. The coating solution is prepared by first drying the Alumina particles a 180 deg C. oven overnight to remove moisture. A 25% by weight slurry of the dried Alumina particles in DMAc is then prepared. The final coating composition is 7% polybenzimidazole (PBI), 28% Alumina and 65% DMAc. The coating is applied with a slot die as a single sided coating and the coated membrane dried in an oven at 80-100 deg C. for a time period of less than 15 minutes.

Example 3

A 13.3% PBI dope was diluted to 7% with DMAc. This coating solution was applied to the 13 um Celgard® EK1321 PE microporous membrane using a reverse gravure coating method followed by immersion of the coated membrane into a room temperature water bath. The membrane was dried in an oven at 80-100 deg C. for 6-10 minutes. The water bath was designed as a circulating bath in order to minimize the concentration of the DMAc. The membrane coating path was designed so that the coated side of the membrane did not come into contact with a roller while in the bath. Immersion time in the bath was at least 1 minute.

Example 4

A 13.3% PBI dope was diluted to 7% with DMAc. This coating solution was applied to the 13 um Celgard® EK1321 PE microporous membrane using a reverse gravure coating method followed by immersion of the coated membrane into a 33% Propylene glycol in water bath at room temperature. The membrane was dried in an oven at 80-100 deg C. for 6-10 minutes. The membrane coating path was designed so that the coated side of the membrane did not come into contact with a roller while in the bath. Immersion time in the bath was at least 1 minute.

Example 5

A 26% PBI dope was diluted to 10% in DMAc. This coating solution was applied to the 13 um Celgard® EK1321 PE microporous membrane using a doctor blade followed by immersion of the coated membrane into a room temperature acetone bath for 3-5 minutes. The membrane was dried in an oven at 100 deg C. for 5 minutes.

Example 6

A 16 um Polyethlyene Celgard® separator membrane was coated with a slurry consisting of a polyaramide dissolved in DMAc mixed with Degussa fumed Alumina 20 nm particles. The coating was applied using a gravure coating method.

utilize either a nozzle or nozzle-less type electrospinning device where the applied voltage is 15 kV, the flow rate is 0.5 ml/h, the gauge of the needle is 7" ID, 0.025" OD and the distance between the needle tip and the collector is 25 cm. The preferred total thickness of the electrospun microporous membrane may be 10-40 more preferably 20-30 The electrospun membrane may or may not contain filler.

Test Procedures

Thickness: Thickness is measured using the Emveco Microgage 210-A precision micrometer according to ASTM D374. Thickness values are reported in units of micrometers (μm).

Gurley: Gurley is defined as the Japanese Industrial Standard (JIS Gurley) and is measured using the OHKEN permeability tester. JIS Gurley is defined as the time in seconds required for 100 cc of air to pass through one square inch of film at a constant pressure of 4.9 inches of water.

Tensile Properties: Machine Direction (MD) and Transverse Direction (TD) tensile strength is measured using Instron Model 4201 according to ASTM-882 procedure.

Puncture strength: Puncture strength is measured using Instron Model 4442 based on ASTM D3763. The measure-

TABLE 1

Separator Membrane Properties of 13 μm Control Sample and present Examples 1-5.

|  | Control | Ex. 1 | Ex. 2 | Ex. 3 | Ex. 4 | Ex. 5 |
|---|---|---|---|---|---|---|
| Base Film Thickness (um) |  | 13 | 13 | 13 | 13 | 13 |
| Base Film type | PE | PE | PE | PE | PE | PE |
| Coating Thickness (um) |  | 4 | 7 | 6 | 6 | 7 |
| Total Thickness (um) | 13 | 17 | 20 | 19 | 20 | 20 |
| JIS Gurley (s) | 212 | 237 | 261 | 437 | 1106 |  |
| Puncture Strength (g) | 329 | 502 | 502 | 542 | 563 |  |
| Tensile Strength in MD (kgf/cm2) | 1824 | 1251 | 1262 | 1449 | 1568 |  |
| Tensile Strength in TD (kgf/cm2) | 996 | 951 | 809 | 948 | 909 |  |
| ER (ohms-cm2) | 1.1-1.3 | 1.7 | 1.9 | 2.5 | 2.9 |  |
| MD Shrinkage at 120 C./1 hr | 8.61 | 6.22 | 5.28 | 2.97 | 2.41 |  |
| TD Shrinkage at 120 C./1 hr | 3.4 | 0 | 0.45 | 0.78 | 1.37 |  |
| MD Shrinkage at 130 C./1 hr | 20.91 | 11.87 | 9.76 | 3.54 | 3.6 |  |
| TD Shrinkage at 130 C./1 hr | 16.53 | 6.45 | 4.39 | 1.16 | 2.14 |  |
| Hot-Tip Propagation Diameter (mm) | 2.43 | 2.8 | 3.5 | 0.63 | 0.7 | <1 |
| e-TMA Rupture Temperature (° C.) | 145 | 154 | 154 | 215 | 220 | >250 |

TABLE 2

Separator Membrane Properties of 16 μm and 13 μm Control Samples and present Examples 6 and 2.

| Property | PE Control (16 um) | Example 6 | Example 2 | PE Control (13 um) |
|---|---|---|---|---|
| Thickness (um) | 16 | 24 | 17 (13 um base film) | 13 |
| Dielectric Breakdown (V) | 2057 | 2893 | 2141 | 1178 |
| Puncture Strength (g) | 516 | 581 | 502 | 329 |
| Tensile Strength-MD kgf/cm2 | 1355 | 1023 | 1262 | 1824 |
| Tensile Strength-TD kgf/cm2 | 1145 | 1056 | 809 | 996 |

Example 7

A high temperature separator membrane may consist of stand alone microporous membrane consisting of electrospun PBI nanofibers using a 15% solution of Polybenzimidazole (PBI) (available as 26% dope from PBI Performance products in Rock Hill, SC) with Dimethylacetamide (DMAc) as the solvent. The electrospinning process can ments are made across the width of microporous stretched product and the average puncture strength is defined as the force required to puncture the test sample.

Shrinkage: Shrinkage is measured at two temperatures by placing a sample in an oven at 120 deg C. for 1 hour and placing a second sample in an oven at 130 deg C. for 1 hour. Shrinkage has been measured in both Machine Direction (MD) and Transverse Direction (TD).

Hot Tip Hole Propagation test: In the Hot Tip hole propagation test a hot tip probe at a temperature of 450 deg C. with a tip diameter of 0.5 mm is touched to the surface of the separator membrane. The hot tip probe approaches the membrane at a speed of 10 mm/minute and is allowed to contact the surface of the separator membrane for period of 10 seconds. Results of the hot tip test are presented as a digital image taken with an optical microscope showing both the shape of the hole formed as a result of the response of the separator membrane to the 450 deg C. hot tip probe and the diameter of the hole in the separator membrane after the hot tip probe is removed. Minimal propagation of a hole in the separator membrane from contact with the hot tip probe simulates the desired response of the separator membrane to a localized hot spot which may occur during an internal short circuit in Li-ion cells.

ER (Electrical Resistance): The units of electrical resistance are ohm-cm². The separator resistance is characterized by cutting small pieces of separators from the finished material and then placing them between two blocking electrodes. The separators are saturated with the battery electrolyte with 1.0 M LiPF$_6$ salt in EC/EMC solvent of 3:7 ratio by volume. The Resistance, R, in Ohms (Ω), of the separator is measured by a 4-probe AC impedance technique. In order to reduce the measurement error on the electrode/separator interface, multiple measurements are needed by adding more layers. Based on the multiple layer measurements, the electric (ionic) resistance, R$_s$ (Ω), of the separator saturated with electrolyte is then calculated by the formula R$_s$=p$_s$l/A where p$_s$ is the ionic resistivity of the separator in Ω-cm, A is the electrode area in cm² and l is the thickness of the separator in cm. The ratio p$_s$/A=is the slope calculated for the variation of the separator resistance (ΔR) with multiple layers (Δδ) which is given by slope=p$_s$/A=ΔR/Δδ.

e-TMA: Expansion-Thermomechanical Analysis method measures the dimensional change of a separator membrane under load in the X (Machine direction) and Y (Transverse direction) directions as a function of temperature. A sample size of 5-10 mm in length and 5 cm in width is held in mini-Instron-type grips with the sample under constant 1 gram tension load. The temperature is ramped at 5 deg C./minute until the film reaches its melt rupture temperature. Typically, upon raising the temperature, separators held under tension show shrinkage, then start to elongate and finally break. The shrinkage of separator is indicated by a sharp dip downward in the curve. The increase in the dimension indicates the softening temperature and the temperature at which the separator breaks apart is the rupture temperature.

Hot ER: Hot Electrical Resistance is a measure of resistance of separator film while the temperature is linearly increased. The rise in resistance measured as impedance corresponds to a collapse in pore structure due to melting or "shutdown" of the separator membrane. The drop in resistance corresponds to opening of the separator due to coalescence of the polymer; this phenomenon is referred to as a loss in "melt integrity". When a separator membrane has a sustained high level of electrical resistance beyond 200 deg C., this is indicative that the separator membrane may prevent electrode shorting in a battery beyond 200 deg C.

In accordance with at least selected embodiments of the present invention, one may use the above tests and/or properties of Tables 1 and 2 to measure or test a potential high temperature separator or composite to see if it may be or may qualify as a non-shutdown high temperature melt integrity (HTMI) separator. If it passes the above tests, then, one may test the separator in a battery, cell or pack to be certain it is a non-shutdown high temperature melt integrity (HTMI) separator and that it preferably will at least keep the electrodes separated at a temperature of at least about 160 deg C., preferably at least 180 deg C., more preferably at least 200 deg C., still more preferably at least 220 deg C., and most preferably at least 250 deg C.

In accordance with at least selected embodiments of the present invention, if the high temperature separator passes the above tests of Tables 1 and 2, this is a good indicator that the separator may be or may qualify as a high temperature melt integrity (HTMI) separator.

In accordance with at least a selected embodiment of the present invention, a good indicator or initial test procedure to see if a separator may be used as or may qualify as a non-shutdown high temperature melt integrity (HTMI) battery separator, includes the steps of:

1) running the above separator Thickness, Gurley, Tensile, Puncture, Shrinkage, Hot Tip, ER, e-TMA, and Hot ER tests on the separator, and if it passes, then
2) running cell or battery tests on the separator to be certain.

In accordance with at least another selected embodiment of the present invention, one may measure or test a high temperature polymer, filler, coating, layer, or separator to see if it may be or may qualify for use in or as a high temperature separator or as a high temperature melt integrity (HTMI) coating, layer or separator, by the method of:

1) checking the polymer (or polymers) and filler (or fillers, if any) of the high temperature coating, layer or stand alone separator to see that they each have a melt temperature or degradation temperature of at least about 160 deg C., preferably at least 180 deg C., more preferably at least 200 deg C., still more preferably 220 deg C., and most preferably at least 250 deg C.;
2) checking the polymer (or polymers) and filler (if any) of the high temperature coating, layer or stand alone separator to see that they each do not dissolve in the electrolyte of the intended battery for the separator;
3) measuring the shrinkage of the stand alone or complete separator (including the high temperature coatings or layers) to ensure it is less than about 15% at 150 deg C., preferably less than 10% at 150 deg C., more preferably less than 7.5% at 150 deg C., and most preferably less than 5% at 150 deg C.; and,
4) if the high temperature coating, layer, stand alone separator, and complete separator pass the three tests above, then, testing the stand alone or complete separator in a battery, cell or pack to be certain it is a high melt temperature separator or high temperature melt integrity (HTMI) separator and that it will at least keep the electrodes separated at a temperature of at least about 160 deg C., preferably at least 180 deg C., more preferably at least 200 deg C., still more preferably at least 220 deg C., and most preferably at least 250 deg C.

If the high temperature coating, layer, stand alone separator, and complete separator pass the three tests above, this is a good indicator that the stand alone or complete separator (including the high temperature coatings or layers) may be or may qualify as a high melt temperature separator or high temperature melt integrity (HTMI) separator, but to be certain the stand alone or complete separator should be tested in a battery, cell, or pack.

In accordance with at least yet another selected embodiment of the present invention, a good indicator or initial test to see if a high temperature coating, layer or stand alone high temperature separator may be used as, may be used in, or may qualify as a high melt temperature separator or high temperature melt integrity (HTMI) coating, layer or separator, includes the steps of:

1) checking the polymer (or polymers) and filler (if any) of the high temperature coating, layer or stand alone separator to see that they each have a melt temperature, degradation temperature, melting point, decomposition temperature, or Tg of at least about 180 deg C., preferably at least 200 deg C., more preferably at least 220 deg C., and most preferably at least 250 deg C.;
2) checking the polymer (or polymers) and filler (if any) of the high temperature coating, layer or stand alone separator to see that they each do not dissolve in the electrolyte of the intended battery for the separator; and, 3) measuring the shrinkage of the stand alone or complete separator (including the high temperature coatings or layers) to ensure the shrinkage is less than about 15% at 150 deg C., preferably less than 10% at 150 deg C., more preferably less than 7.5% at 150 deg C., and most preferably less than 5% at 150 deg C.

If the high temperature coating, layer, stand alone separator, and complete separator pass the three tests above, this is a good indicator or initial test that the high temperature coating, layer, stand alone separator, or complete separator may be used as, may be used in, or may qualify as a high melt temperature separator or high temperature melt integrity (HTMI) coating, layer or separator, and that the separator may at least keep the electrodes separated at a temperature of at least about 160 deg C., preferably at least 180 deg C., more preferably at least 200 deg C., still more preferably at least 220 deg C., and most preferably at least 250 deg C. To be certain, one should test the stand alone or complete separator in a battery, cell or pack.

Adding filler or particles to the high temperature polymer coating or layer can make it easier to form pores as the spaces or voids between the filler or particles help form the pores, may reduce cost, etc. However, adding filler or particles to the high temperature polymer coating material or batch can make polymer processing more difficult. As such it is possibly preferred to not add filler or particles to keep the processing simpler and to use the bath to form the pores.

In accordance with at least selected embodiments, an ultra high temperature separator has a high level of dimensional and/or structural integrity needed to prevent contact between the anode and cathode and provides or allows for ionic flow between the anode and cathode when the battery is maintained at elevated temperatures, preferably at least about 250 deg C., more preferably at least 265 deg C., for a period of time, preferably at least about 1 hour, more preferably at least two hours or more.

In at least one embodiment, there is provided a separator with a high melt temperature, preferably >160 deg C., and more preferably >180 deg C., that has the high level of dimensional and/or structural integrity needed to prevent contact between the anode and cathode when the battery is maintained at elevated temperatures for a period of time. In this embodiment, it is highly desirable to have such a separator with a high level of dimensional and structural integrity. Such a separator is referred to as a high temperature melt integrity (HTMI) separator. This separator is a high melt temperature battery separator including a porous membrane, film or base coated with a high glass transition temperature (Tg) polymer (also referred to as a binder).

In at least another embodiment, there is provided a stand alone porous membrane made using a high Tg polymer. This high temperature separator has a high melt temperature, preferably >160 deg C. and more preferably >180 deg C., has a high level of dimensional and/or structural integrity needed to prevent contact between the anode and cathode when the battery is maintained at elevated temperatures for a period of time, and allows for ionic flow between the anode and cathode when the battery is maintained at elevated temperatures for a period of time. In this embodiment, it is highly desirable to have such a separator with a high level of dimensional and structural integrity. Such a separator is referred to as a high temperature melt integrity (HTMI) separator. This separator preferably does not shutdown, does not melt, and continues to fully function at high temperatures.

In at least another embodiment, there is provided a stand alone porous membrane made using a high Tg polymer. This high temperature separator has a high melt temperature, preferably >160 deg C. and more preferably >180 deg C., has a high level of dimensional and/or structural integrity needed to prevent contact between the anode and cathode when the battery is maintained at elevated temperatures for a period of time, and may allow for ionic flow between the anode and cathode when the battery is maintained at elevated temperatures for a period of time. In this embodiment, it is highly desirable to have such a separator with a high level of dimensional and structural integrity. Such a separator is referred to as a high temperature melt integrity (HTMI) separator without shutdown. This separator preferably does not melt or melt down, and may continue to partially or fully function at high temperatures.

At least selected embodiments are directed to:

A high melt temperature microporous Lithium-ion rechargeable battery separator, separator membrane, and the like that preferably prevents contact between the anode and cathode when the battery is maintained at elevated temperatures for a period of time and that also continue to provide a substantial level of battery function (ionic transfer, charge and/or discharge) when the battery is maintained at elevated temperatures for a period of time.

A method of making or using one or more high melt temperature microporous Lithium-ion rechargeable battery separators, separator membranes, and the like that preferably prevent contact between the anode and cathode when the battery is maintained at elevated temperatures for a period of time and that also continue to provide a substantial level of battery function (ionic transfer, charge and/or discharge) when the battery is maintained at elevated temperatures for a period of time.

A Lithium-ion rechargeable battery including one or more high melt temperature microporous Lithium-ion rechargeable battery separators, separator membranes, and the like (preferably without shutdown) that preferably prevent contact between the anode and cathode when the battery is maintained at elevated temperatures for a period of time.

A shutdown Lithium-ion rechargeable battery separator that preferably prevents contact between the anode and cathode when the battery is maintained at elevated temperatures for a period of time.

A Lithium-ion rechargeable battery, cell, pack, accumulator, capacitor, or the like including one or more high melt temperature separators, separator membranes, and the like, that preferably prevents contact between the anode and cathode when the battery is maintained at elevated temperatures for a period of time, and wherein the battery, cell, pack, or the like may be of any shape, size and/or configuration, such as cylindrical, flat, rectangular, large scale Electric Vehicle (EV), prismatic, button, envelope, box, and/or the like.

A separator, separator membrane, or the like for a Lithium-ion rechargeable battery that is capable of at least partial functioning at high temperatures, for example, at about 160 deg C. or more, at about 180 deg C. or more, or higher, for at least a short period of time, wherein the partial functioning includes keeping the electrodes (anode and cathode) physically separated.

A high melt temperature separator that does not shut down at 130 deg C. and that keeps the electrodes (anode and cathode) physically separated at about 160 deg C.

A microporous battery separator that includes at least one layer or component having a high melt temperature.

A high temperature separator having a high melt temperature, preferably >160 deg C. and more preferably >180 deg C., and having a high level of dimensional or structural integrity needed to prevent contact between the anode and cathode when the battery is maintained at elevated temperatures for a period of time.

A high temperature melt integrity (HTMI) separator with a high level of dimensional or structural integrity.

A high melt temperature battery separator including a porous membrane coated with a high glass transition temperature (Tg) polymer or blend (also referred to as a binder) on at least one side thereof.

A stand alone (single or multi-ply) porous membrane made using a high Tg polymer or blend.

A high melt temperature microporous Lithium-ion rechargeable battery separator or membrane that is capable of retaining its physical structure up to 250 deg C. in a Lithium-ion rechargeable battery (cell, pack, battery, accumulator, capacitor, or the like).

The separator or membrane above, composed of one or more polymers which have a glass transition temperature ($T_g$) greater than 165 deg C., preferably greater than 180 deg C., more preferably at least 250 deg C., and which is soluble in at least one moderately volatile solvent.

The separator or membrane above, composed of a single or double sided high Tg polymer coating applied to a microporous base membrane or of a free standing high Tg polymer microporous separator or membrane.

The separator or membrane above, with the high Tg polymer coated onto a microporous base membrane made of a thermoplastic polymer, the thermoplastic polymers include, but are not limited to, polyolefins such as polyethylene, polypropylene, polymethylpentene, and blends, mixtures, or combinations thereof.

The separator or membrane above, wherein such microporous base membranes are manufactured by a dry stretch process (known as the Celgard® dry stretch process), by a wet process also known as a phase separation or extraction process, by a particle stretch process, and/or the like.

The separator or membrane above, wherein the base membrane may be a single layer (one or more plies) or multi-layer membrane, such as a tri-layer membrane e.g., Polypropylene/Polyethylene/Polypropylene (PP/PE/PP) or Polyethylene/Polypropylene/Polyethylene (PE/PP/PE), bi-layer membrane (PP/PE or PE/PP), or the like.

The separator or membrane above, wherein the base membrane or film, such as Polypropylene, may optionally be pre-treated in order to alter the surface characteristics of the membrane and improve the adhesion of the high Tg polymer coating to the base membrane.

The separator or membrane above, wherein the pre-treatments may include, but are not limited to, priming, stretching, corona treatment, plasma treatment, and/or coating, such as surfactant coatings on one or both sides thereof.

The separator or membrane above, wherein the high Tg polymer may be applied by a coating step followed by an immersion step, and wherein the high Tg coated membrane is immersed into a gelation bath to both precipitate the high Tg polymer and to remove the solvent for high Tg polymer in order to form a high Tg porous coating or layer.

The separator or membrane above, wherein the high Tg polymer may be applied by a coating step followed by an immersion step wherein the high Tg coated membrane is immersed into a bath to precipitate the high Tg polymer.

The separator or membrane above, wherein the high Tg polymer is polybenzimidazole (PBI).

A high melt temperature electrospun coated microporous Lithium-ion rechargeable battery separator, separator membrane, and the like that preferably prevents contact between the anode and cathode when the battery is maintained at elevated temperatures for a period of time.

A method of making or using one or more high melt temperature electrospun coated microporous Lithium-ion rechargeable battery separators, separator membranes, and the like that preferably prevent contact between the anode and cathode when the battery is maintained at elevated temperatures for a period of time.

A Lithium-ion rechargeable battery including one or more high melt temperature electrospun coated microporous Lithium-ion rechargeable battery separators, separator membranes, and the like that preferably prevent contact between the anode and cathode when the battery is maintained at elevated temperatures for a period of time.

A Lithium-ion rechargeable battery that is capable of functioning at high temperatures, preferably including components such as an electrospun coated microporous battery separator or separator membrane that preferably functions at high temperatures.

An improved electrospun battery separator for at least certain high temperature applications, for a high melt temperature electrospun coated microporous Lithium-ion rechargeable battery separator, separator membrane, and the like that preferably prevents contact between the anode and cathode when the battery is maintained at elevated temperatures for a period of time, for methods of making and/or using such separators, separator membranes, and the like, and/or for Lithium-ion rechargeable batteries including one or more such separators, separator membranes, and the like.

A Lithium-ion rechargeable battery, cell, pack, accumulator, capacitor, or the like including one or more high temperature electrospun coated separators, separator membranes, and the like, wherein the Lithium-ion rechargeable battery, cell, pack, or the like may be of any shape, size and/or configuration, such as cylindrical, flat, rectangular, large scale Electric Vehicle (EV), prismatic, button, envelope, box, and/or the like.

An electrospun coated separator, separator membrane, or the like for a Lithium-ion rechargeable battery that is capable of functioning at high temperatures, for example, at about 160 deg C. or more, at about 180 deg C. or more, or higher, for at least a short period of time, wherein "functioning" may include keeping the electrodes (anode and cathode) physically separated, allowing ionic flow between the electrodes, or both.

An electrospun coated microporous battery separator that functions at high temperatures, does not melt at high temperatures, has a high melt temperature, includes at least one layer or component having a high melt temperature, and/or the like.

An electrospun coated high temperature separator having a high melt temperature, preferably >160 deg C. and more preferably >180 deg C., and having a high level of dimensional or structural integrity needed to prevent contact between the anode and cathode when the battery is maintained at elevated temperatures for a period of time.

An electrospun coated high temperature melt integrity (HTMI) separator with a high level of dimensional or structural integrity.

A high melt temperature microporous Lithium-ion rechargeable battery separator or membrane that is electrospun coated with a PBI on at least one side thereof.

The electrospun coated separator or membrane above composed of a single or double sided PBI electrospun coating applied to a microporous base membrane.

The electrospun coating above that consists of PBI or a blend of PBI with one or polymers including polyamides, polyaramids, polyimides, polyamideimides, polyvinylidene fluoride or co-polymers of polyvinylidene fluoride and blends, mixtures and/or combinations thereof.

The electrospun coating above that is composed of PBI that is at least 4 μm in thickness, preferably at least 5 μm in thickness, more preferably at least 6 μm in thickness, and most preferably at least 7 μm in thickness.

The electrospun coating above that is composed of PBI or a blend of PBI with one or polymers including polyamides, polyaramids, polyimides, polyamideimides, polyvinylidene fluoride or co-polymers of polyvinylidene fluoride and blends, mixtures and/or combinations thereof that is at least that is at least 4 μm in thickness, preferably at least 5 μm in thickness, more preferably at least 6 μm in thickness, and most preferably at least 7 μm in thickness.

The electrospun coating above that is composed of PBI or a blend of PBI with one or polymers including polyamides, polyaramids, polyimides, polyamideimides, polyvinylidene fluoride or co-polymers of polyvinylidene fluoride and blends, mixtures and/or combinations thereof that has an Add-on of at least 2.0 to 6.0 g/m$^2$, more preferably 2.2 to 5.0 g/m$^2$ and most preferably 2.5 to 5.0 g/m$^2$.

The separator or membrane above with the PBI electrospun coated onto a microporous base membrane made of a thermoplastic polymer, the thermoplastic polymers include, but are not limited to, polyolefins such as polyethylene, polypropylene, polymethylpentene, and blends, mixtures, or combinations thereof.

The separator or membrane above having such microporous base membranes manufactured by a dry stretch process (known as the Celgard® dry stretch process), by a wet process also known as a phase separation or extraction process, by a particle stretch process, or the like.

The separator or membrane above wherein the base membrane may be a single layer polyprolylene or polyethylene (one or more plies) or multi-layer membrane, such as a tri-layer membrane e.g., Polypropylene/Polyethylene/Polypropylene (PP/PE/PP) or Polyethylene/Polypropylene/Polyethylene (PE/PP/PE), bi-layer membrane (PP/PE or PE/PP), or the like.

The separator or membrane above wherein the base membrane or film, such as Polypropylene, may optionally be pre-treated in order to alter the surface characteristics of the membrane and improve the adhesion of the electrospun PBI coating to the base membrane.

The separator or membrane above wherein the pre-treatments may include, but are not limited to, priming, stretching, corona treatment, plasma treatment, and/or coating, such as surfactant coating(s) on one or both sides thereof.

Disclosed or provided are high melt temperature microporous Lithium-ion rechargeable battery separators, non-shutdown high melt temperature battery separators, battery separators, membranes, composites, and the like that preferably prevent contact between the anode and cathode when the battery is maintained at elevated temperatures for a period of time, methods of making, testing and/or using such separators, membranes, composites, and the like, and/or batteries, Lithium-ion rechargeable batteries, and the like including one or more such separators, membranes, composites, and/or the like.

The invention is not limited by the above description or examples.

The invention claimed is:

1. A battery separator for use as a high melt temperature microporous Lithium-ion rechargeable battery separator, comprising:
a base membrane, made by a dry stretch process and composed of one or more polyolefin polymers, and coated with a high glass transition (Tg) polymeric coating which comprises one or more high Tg polymers selected from the group consisting of: polyimidazoles, polybenzimidazole (PBI), polyketones, and combinations thereof and having a Tg greater than 165 deg C., and which is soluble in at least one moderately volatile solvent, wherein the high Tg polymeric coating comprises a plurality of electrospun nanofibers of the one or more high Tg polymers and fumed alumina particles, and wherein one or both of (a) the base membrane is a multi-layered membrane and (b) the base membrane is pre-treated with priming, stretching, corona treatment, plasma treatment, and/or surfactant coating on one or both sides of the base membrane.

2. The battery separator of claim 1, wherein the one or more polymers have a glass transition temperature (Tg) greater than 180 deg C.

3. The battery separator of claim 1, wherein the one or more polymers have a glass transition temperature (Tg) of at least 250 deg C.

4. The battery separator of claim 1, wherein the separator prevents contact between the anode and cathode when the battery is maintained at elevated temperatures for a period of time.

5. The battery separator of claim 1, wherein the separator is capable of at least partial functioning at high temperatures of about 160 deg C. or more for at least 60 minutes, and wherein the partial functioning includes both keeping the electrodes (anode and cathode) physically separated and allowing ionic flow between the electrodes.

6. The battery separator of claim 1, wherein the separator is capable of at least partial functioning at high temperatures of about 180 deg C. or more for at least 60 minutes, and wherein the partial functioning includes both keeping the electrodes (anode and cathode) physically separated and allowing ionic flow between the electrodes.

7. The battery separator of claim 1, wherein the separator is capable of at least partial functioning at high temperatures of about 220 deg C. or more for at least 60 minutes, and wherein the partial functioning includes both keeping the electrodes (anode and cathode) physically separated and allowing ionic flow between the electrodes.

8. The battery separator of claim 1, where the separator is a non-shutdown HTMI separator.

9. A lithium ion battery comprising the battery separator of claim 1.

10. A non-shutdown high temperature melt integrity (HTMI) separator for use in a Lithium-ion battery with a high level of dimensional or structural integrity, comprising:
a base membrane, made by a dry stretch process and composed of one or more polyolefin polymers, and coated with a high glass transition (Tg) polymeric coating which comprises one or more high Tg polymers which have a Tg greater than 165 deg C., and which is soluble in at least one moderately volatile solvent, and wherein the high Tg polymeric coating comprises a plurality of electrospun nanofibers of the one or more high $T_g$ polymers and fumed alumina particles, and wherein one or both of (a) the base membrane is a multi-layered membrane and (b) the base membrane is pre-treated with priming, stretching, corona treatment, plasma treatment, and/or surfactant coating on one or both sides of the base membrane.

11. The HTMI separator of claim 10, wherein the separator is a ultra high melt temperature microporous Lithium-ion rechargeable battery separator or membrane that is capable of retaining its physical structure up to 250 deg C. in a Lithium-ion rechargeable battery, cell, pack, battery, accumulator, or capacitor.

12. The HTMI separator of claim 10, wherein the separator is a high melt temperature microporous Lithium-ion rechargeable battery separator or membrane that is capable of retaining its physical structure up to 160 deg C. in a Lithium-ion rechargeable battery, cell, pack, battery, accumulator, or capacitor.

13. The HTMI separator of claim 10, wherein the high Tg polymer is coated onto a microporous base membrane or film made of a thermoplastic polymer selected from the group consisting of polyethylene, polypropylene, polymethylpentene, and blends, mixtures, or combinations thereof.

14. The HTMI separator of claim 13, wherein the base membrane or film may optionally be pre-treated in order to alter the surface characteristics of the membrane or film and improve the adhesion of the high Tg polymer coating to the base membrane or film, and wherein the pre-treatments may include priming, stretching, corona treatment, plasma treatment, and/or coating, such as surfactant coatings on one or both sides thereof.

15. The HTMI separator of claim 10, wherein the high Tg polymer is polybenzimidazole (PBI).

16. A lithium ion battery comprising the HTMI battery separator of claim 10.

* * * * *